(12) United States Patent
Martín Barrera et al.

(10) Patent No.: US 8,857,017 B2
(45) Date of Patent: Oct. 14, 2014

(54) MAGNETIC TAPE DEVICE FOR MAGNETIC ENCODER AND METHODS FOR MANUFACTURING AND MOUNTING SAID DEVICE

(75) Inventors: Gonzalo Martín Barrera, Seville (ES); Rafael Morillo Morales', Seville (ES); Rafael Osuna González-Aguilar, Seville (ES)

(73) Assignee: Abengoa Solar New Technologies S.A., Seville (ES)

( * ) Notice: Subject to any disclaimer, the term of this patent is extended or adjusted under 35 U.S.C. 154(b) by 400 days.

(21) Appl. No.: 13/143,764

(22) PCT Filed: Jan. 8, 2010

(86) PCT No.: PCT/ES2010/070009
§ 371 (c)(1),
(2), (4) Date: Sep. 16, 2011

(87) PCT Pub. No.: WO2010/079254
PCT Pub. Date: Jul. 15, 2010

(65) Prior Publication Data
US 2012/0001709 A1    Jan. 5, 2012

(30) Foreign Application Priority Data
Jan. 9, 2009 (ES) .................................. 200900053

(51) Int. Cl.
*F16L 33/08*    (2006.01)
*G01B 3/00*    (2006.01)
*G01D 5/14*    (2006.01)

(52) U.S. Cl.
CPC ................ *G01D 5/145* (2013.01); *G01B 3/004* (2013.01)
USPC .......................................... 24/274 R; 24/303

(58) Field of Classification Search
CPC ... H01F 7/0263; H01F 7/0242; H01F 7/0247; H01P 11/00; G01D 18/00; H02K 35/02; H02K 39/00; G01B 3/004; F16L 33/08
USPC ........ 335/219, 285; 24/66.1, 274 R, 274 WB, 24/279, 280, 303
See application file for complete search history.

(56) References Cited

U.S. PATENT DOCUMENTS 3,195,021 A * 7/1965 Martin .......................... 335/285
3,536,285 A * 10/1970 Vaughn ....................... 248/309.4

(Continued)

FOREIGN PATENT DOCUMENTS

DE              43 22 661 A1    1/1994
DE      20 2008 006293 U1      7/2008

*Primary Examiner* — Robert J Sandy
*Assistant Examiner* — Louis Mercado
(74) *Attorney, Agent, or Firm* — Ladas & Parry LLP

(57) ABSTRACT

Magnetic tape (1) device (4) for magnetic encoder and manufacturing and installation procedures for this device (4). The magnetic tape (1) has a magnetized surface and a non-magnetized surface in the device (4), which also comprises a clamp (2) with fastening means, such that when the device (4) is mounted on a rotating shaft (5) then the magnetic tape (1) is located between the outer surface of the shaft (5) and the inner surface (7) of the clamp (2) on which the magnetic tape (1) is adhered by its magnetized surface. A manufacturing procedure for this device (4) and an installation procedure for this device (4) on a rotating shaft (5) is also described.

5 Claims, 1 Drawing Sheet

(56) References Cited

U.S. PATENT DOCUMENTS

| | | | | |
|---|---|---|---|---|
| 3,755,857 | A * | 9/1973 | Simoneaux | 24/3.2 |
| 3,827,021 | A * | 7/1974 | Phelon | 335/285 |
| 4,336,806 | A * | 6/1982 | Eldridge, Jr. | 604/174 |
| 5,682,653 | A * | 11/1997 | Berglof et al. | 24/303 |
| 6,453,518 | B1 * | 9/2002 | Adams et al. | 24/67.9 |
| 6,496,094 | B2 * | 12/2002 | May, III | 335/285 |
| 7,310,035 | B2 * | 12/2007 | Wooten | 335/306 |
| 7,356,884 | B2 * | 4/2008 | Packard et al. | 24/16 PB |
| 7,850,302 | B1 * | 12/2010 | Riazi | 351/158 |
| 2002/0083769 | A1 | 7/2002 | Peterlechner et al. | |
| 2003/0135959 | A1 * | 7/2003 | Wales | 24/30.5 R |
| 2008/0000055 | A1 * | 1/2008 | Kuhlmann | 24/16 PB |

* cited by examiner

MAGNETIC TAPE DEVICE FOR MAGNETIC ENCODER AND METHODS FOR MANUFACTURING AND MOUNTING SAID DEVICE

FIELD OF THE INVENTION

This invention refers to a magnetic tape device for magnetic encoders whose main application is in solar trackers for cylindrical parabolic solar collectors, to a manufacturing procedure for this device and to an installation procedure for this device.

BACKGROUND OF THE INVENTION

Cylindrical parabolic collectors or concentrators concentrate solar radiation for the purpose of attaining the high temperatures required to produce electric power.

A cylindrical parabolic collector consists of a cylindrical parabolic mirror that reflects all the solar radiation it receives on a glass tube placed along the focal line of the mirror; on the inside of the latter is an absorbent tube through which the heat carrying fluid circulates.

In order that, at all times, the result of the reflection on our mirror is that the solar radiation strikes the absorbent tube, our cylindrical parabolic collector must follow the sun, thus requiring a solar tracker device, i.e., a tracking device of the sun's position that rotates the cylindrical parabolic mirrors of the collector around a shaft, such that the solar rays always strike perpendicularly to the collector opening. Therefore, it is essential that the measurement of the angular position of the collector structure be as accurate as possible.

The angular position of the shaft that rotates together with the collector structure should be measured in the centre of this shaft, since a measurement at the ends would not be optimal because of the torsion of this shaft. It is therefore not advisable to place a conventional encoder on one end of this shaft to obtain a reliable measurement.

To be able to measure the angular position of the structure shaft, there are encoders available that consist of a magnetized tape at defined distances and a sensor head. When a relative movement occurs between the sensor head and the magnetized tape, the head generates a series of electric pulses that can be read by a programmable logic controller to calculate the angular position of the collector.

The normal practice to secure the magnetized tape to the structure's shaft of rotation consists of sticking it directly on this shaft by the non-magnetized surface, such that the magnetized surface is facing out so that it can be read by the sensor head. However, one drawback of this arrangement is that securing the tape by sticking it on is not durable, which means that the magnetic tape eventually comes unstuck at its ends. Moreover, as it is a permanent fastening system, if any error is made during the first installation of the tape, it is very difficult to rectify it later because, in the event that the tape comes unstuck, it is not possible to again stick it onto the surface it was on. This surface also has a certain roughness that hinders the sticking process.

SUMMARY OF THE INVENTION

The object of this invention is to provide a magnetic tape device for magnetic encoders that improves the securing of the tape to the rotating shaft.

The invention provides a magnetic tape device for magnetic encoders in which the magnetic tape has a magnetized surface and a non-magnetized surface, and which comprises a clamp with fastening means, such that when the device is mounted on a rotating shaft then the magnetic tape is located between the outer surface of the shaft and the inner surface of the clamp on which the magnetic tape is adhered by its magnetized surface.

It also provides a manufacturing procedure for a magnetic tape device for magnetic encoders that comprises the following stages:
  apply adhesive to the magnetized surface of the magnetic tape, and
  secure the magnetized surface of the magnetic tape to the surface of the clamp that is the inner surface of the clamp when the device is mounted on a rotating shaft.

Also provided is an installation procedure for a magnetic tape device for magnetic encoders on a rotating shaft that comprises the following stages:
  placement of the device on the rotating shaft,
  closure of the device using fastening means, and
  adjustment of the fit of the device on the shaft.

This configuration of the device, with a clamp with fastener, the magnetic tape adhered by its magnetized surface to the surface of the clamp that is the inner surface of the clamp when the device is mounted on a rotating shaft, succeeds in achieving a satisfactory securing of the device that comprises the magnetic tape to the rotating shaft during its entire useful life, since this device does not come unstuck, nor does it fall off or move once it has been installed.

Another advantage of the device of the invention is that the installation of the clamp makes it possible to protect the tape from rain and solar radiation, which would deteriorate its material.

Another further advantage is that, since it is faster to install than the previous system in which a meticulous sticking process was required, the time and cost of assembly of the installation are reduced.

Other advantageous embodiments of the invention are described in the dependent claims.

BRIEF DESCRIPTION OF THE DRAWINGS

Following is a non-limitative illustration of the object of this invention, making reference to the accompanying drawings, where.

DETAILED DESCRIPTION OF THE INVENTION

Figure 1:
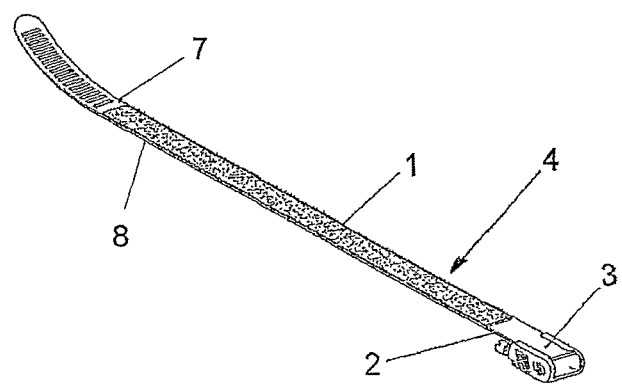
FIG. 1 shows a view in perspective of the device of this invention before assembly.

FIG. 1 shows that the device 4 of the invention comprises a magnetic tape 1 adhered on a clamp 2, which has fastening means 3 at one of its ends. The magnetic tape 1 is a commercial tape with a magnetized surface and a non-magnetized surface, and it is adhered by its magnetized surface to the surface 7 of the clamp 2 that is the inner surface of the clamp 2 when the device 4 is mounted on a rotating shaft 5 (see FIG. 2). Therefore, the surface of the magnetic tape 1 that is visible in FIG. 1 is the non-magnetized surface. Therefore, the surface of the magnetic tape 1 that is visible in FIG. 1 is the non-magnetized surface.

Figure 2:
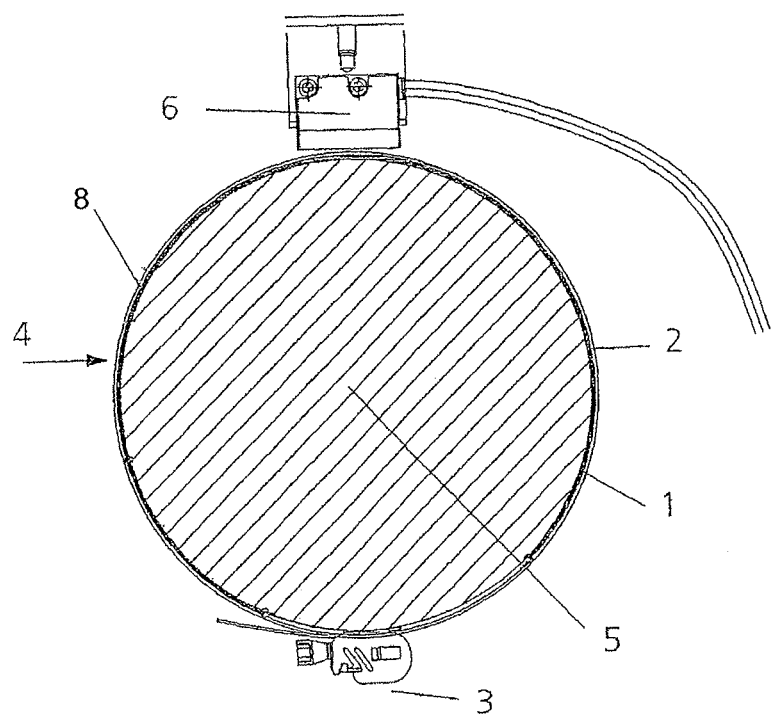
FIG. 2 shows a front view of the device of this invention once it has been assembled and is functioning.

FIG. 2 shows the device 4 of the invention once it has been mounted on a rotating shaft 5, e.g., the rotating shaft of the structure of cylindrical parabolic collectors. We see that the device 4 clamps this shaft 5 and that the means 3 enables closure of the device 4, thus fitting the device to this shaft 5. The magnetic tape 1 is therefore located between the outer surface of the shaft 5 and the inner surface 7 of the clamp 2, on which it is adhered, and as a result it will not be able to become unstuck. The assembly should be made so that this magnetic tape 1 is not excessively compressed.

This FIG. 2 also shows the position of the sensor head 6, which will read the positions of the magnetic tape 1.

It is important to remember that there should be an adequate separation between the magnetized surface of the magnetic tape 1 and the reading surface of the sensor head 6 so that the positions of the magnetic tape 1 can be properly read. The thickness of the clamp 2 will be suited to the provided commitment of ease of assembly, robustness and protection.

Therefore, to proceed to install the device 4 of the invention on a shaft 5 of rotation, this device 4 is placed on the shaft 5, surrounding it in the desired position, and the device 4 is then closed, adjusting the fit of the device 4 on the shaft 5.

The manufacturing procedure for a magnetic tape 1 device 4 for magnetic encoders under the invention would comprise the following stages:
  apply adhesive to the magnetized surface of the magnetic tape 1, and
  secure the magnetized surface of the magnetic tape 1 to the surface 7 of the clamp 2 that is the inner surface of the clamp 2 when the device 4 is mounted on a rotating shaft 5.

The fastening means 3 will preferably be a fast mechanical fastener with worm screw and grooved zone. Another possibility would be a mechanical fastener with worm screw and grooved zone, but without the advantages of fast opening.

Although some embodiments of the invention have been described and represented, it is evident that modifications included in its scope may be made to them, as it should not be considered that the scope is limited to these embodiments, but rather solely to the contents of the following claims.

The invention claimed is:

1. Magnetic tape device for magnetic encoders, in which the magnetic tape device has a magnetized surface extending along a length of the tape and a non-magnetized surface, said magnetic tape device comprising a clamp having an inner surface and fastening means comprising a worm screw and a grooved zone, such that when the device is mounted on a rotating shaft having an outer surface the magnetic tape is located between the outer surface of the shaft and the inner surface of the clamp on which the magnetic tape is adhered by its magnetized surface.

2. Magnetic tape device for magnetic encoders, as per claim 1, wherein the fastening means is fast mechanical fastener with a worm screw with grooved zone and fast opening.

3. Installation procedure for a magnetic tape device for magnetic encoders on a rotating shaft wherein said magnetic tape device has a magnetized surface extending along a length of the tape and a non-magnetized surface, said magnetic tape device comprising a clamp having an inner surface and fastening means, such that when the device is mounted on a rotating shaft having an outer surface the magnetic tape is located between the outer surface of the shaft and the inner surface of the clamp on which the magnetic tape is adhered by its magnetized surface, which procedure comprises:
  placement of the device on the rotating shaft,
  closure of the device using the fastening means, and
  adjustment to fit of the device on the shaft.

4. Installation procedure for the magnetic tape device for magnetic encoders of claim 3 on the rotating shaft, which procedure comprises:
  placement of the device on the rotating shaft,
  closure of the device using the fastening means, and
  adjustment to fit of the device on the shaft.

5. Installation procedure as claimed in claim 3 for the magnetic tape device for magnetic encoders on the rotating shaft wherein the fastening means of said magnetic tape device comprises a worm screw and grooved zone, which procedure comprises:
  placement of the device on the rotating shaft,
  closure of the device using the fastening means, and
  adjustment to fit of the device on the shaft.

* * * * *